United States Patent
Blaze et al.

(10) Patent No.: US 6,256,734 B1
(45) Date of Patent: Jul. 3, 2001

(54) METHOD AND APPARATUS FOR COMPLIANCE CHECKING IN A TRUST MANAGEMENT SYSTEM

(75) Inventors: Matthew A. Blaze; Joan Feigenbaum, both of New York, NY (US); Martin J Strauss, Summit, NJ (US)

(73) Assignee: AT&T, New York, NY (US)

( * ) Notice: Subject to any disclaimer, the term of this patent is extended or adjusted under 35 U.S.C. 154(b) by 0 days.

(21) Appl. No.: 09/414,778

(22) Filed: Oct. 8, 1999

Related U.S. Application Data (63) Continuation of application No. 09/250,296, filed on Feb. 17, 1999
(60) Provisional application No. 60/074,848, filed on Feb. 17, 1998.

(51) Int. Cl.[7] .................................................. H04L 9/00
(52) U.S. Cl. .................. 713/157; 713/156; 713/158; 713/159; 705/51; 705/54
(58) Field of Search .................... 713/156, 157, 713/158, 159; 705/51, 54

(56) References Cited

U.S. PATENT DOCUMENTS

| | | | |
|---|---|---|---|
| 5,315,657 | * | 5/1994 | Abadi et al. ................... 713/201 |
| 5,619,657 | * | 4/1997 | Sudama ........................... 709/225 |
| 5,666,416 | * | 9/1997 | Micali ............................. 713/158 |
| 5,958,050 | * | 9/1999 | Griffin et al. .................. 713/200 |
| 5,960,083 | * | 9/1999 | Micali ............................. 713/175 |
| 6,049,872 | * | 4/2000 | Reiter et al. ................... 713/157 |

OTHER PUBLICATIONS

Matt Blaze, Joan Feigenbaum and Jack Lacy, "Decentralized Trust Management," Proc. IEEE Conference on Security (May 1996).*

\* cited by examiner

*Primary Examiner*—Tod Swann
*Assistant Examiner*—Ronald F. Sulpizio, Jr.

(57) ABSTRACT

A method and apparatus are provided for compliance checking in a trust-management system A request r, a policy assertion ($f_0$, POLICY), and n−1 credential assertions ($f_1$, $s_1$), . . . , ($f_{n-1}$, $s_{n-1}$) are received, each credential assertion comprising a credential function $f_i$ and a credential source $s_i$. Each assertion may be monotonic, authentic, and locally bounded. An acceptance record set S is initialized to {(Λ, Λ, R)}, where Λ represents a distinguished null string, and R represents the request r. Each assertion ($f_i$, $s_i$), where i represents the integers from n−1 to 0, is run and the result is added to the acceptance record set S. This is repeated mn times, where m represents a number greater than 1, and an acceptance is output if any of the results in the acceptance record set S comprise an acceptance record (0, POLICY, R).

20 Claims, 2 Drawing Sheets

METHOD AND APPARATUS FOR COMPLIANCE CHECKING IN A TRUST MANAGEMENT SYSTEM

CROSS REFERENCE TO RELATED APPLICATIONS

This application is a continuaiton of No. 09/250,296 filed Feb. 17, 1999.

The present application claims the benefit of U.S. provisional patent application Ser. No. 60/074,848 entitled "Compliance Checking in the Policy Maker Trust Management System" to Matthew A. Blaze, Joan Feigenbaum and Martin J. Strauss and filed on Feb. 17, 1998.

FIELD OF THE INVENTION

The invention relates to trust-management systems. More particularly, the invention relates to a method and apparatus for compliance checking in a trust-management system.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Emerging electronic commerce services that use public-key cryptography on a mass-market scale require sophisticated mechanisms for managing trust. For example, a service that receives a signed request for action may need to answer a basic question: "is the key used to sign this request authorized to take this action?" In some services, the question may be more complicated, requiring techniques for formulating security policies and security credentials, determining whether particular sets of credentials satisfy the relevant policies, and deferring trust to third parties. Matt Blaze, Joan Feigenbaum and Jack Lacy, "Decentralized Trust Management," Proc. IEEE Conference on Security and Privacy (May 1996) (hereinafter "Blaze, Feigenbaum and Lacy"), the entire contents of which is hereby incorporated by reference, discloses such a trust-management problem as a component of network services and describes a general tool for addressing it, the "PolicyMaker" trust-management system.

As will be explained, the heart of the trust-management system is an algorithm for compliance checking. The inputs to the compliance checker are a "request," a "policy" and a set of "credentials." The compliance checker returns a "yes" (acceptance) or a "no" (rejection), depending on whether the credentials constitute a proof that the request complies with the policy. Thus, a central challenge in trust management is to find an appropriate notion of "proof" and an efficient algorithm for checking proofs of compliance.

Unfortunately, the compliance-checking problem may be mathematically undecidable in its most general form. Moreover, the compliance-checking problem is still non-deterministic polynomial time (NP) hard even when restricted in several natural ways.

Blaze, Feigenbaum and Lacy discloses the trust-management problem as a distinct and important component of security in network services. Aspects of the trust-management problem include formulation of policies and credentials, deferral of trust to third parties, and a mechanism for "proving" that a request, supported by one or more credentials, complies with a policy. A comprehensive approach to trust management independent of the needs of any particular product or service is disclosed along with a trust-management system that embodies the approach.

In particular, the PolicyMaker system comprises policies, credentials, and trust relationships that are expressed as finctions or programs (or parts of programs) in a "safe" programming language. A common language for policies, credentials, and relationships makes it possible for applications to handle security in a comprehensive, consistent, and largely transparent manner.

The PolicyMaker system is also expressive enough to support the complex trust relationships that can occur in large-scale network applications. At the same time, simple and standard policies, credentials, and relationships can be expressed succinctly and comprehensibly.

The Policy Maker system provides local control of trust relationships. Each party in the network can decide in each transaction whether to accept the credential presented by a second party or, alternatively, which third party it should ask for additional credentials. Local control of trust relationships, as opposed to a top-down centralized approach, eliminates the need for the assumption of a globally known, monolithic hierarchy of "certifying authorities." Such hierarchies do not scale easily beyond single "communities of interest" in which trust can be defined unconditionally from the top down.

The PolicyMaker mechanism for checking that a set of credentials proves that a requested action complies with local policy does not depend on the semantics of the application-specific request, credentials or policy. This allows different applications with varying policy requirements to share a credential base and a trust-management infrastructure.

Three examples of application-specific requests, and local policies with which they may need to comply, will now be described. Although individually the examples are of limited complexity, collectively they demonstrate that an expressive, flexible notion of "proof of compliance" is needed.

As a first example, consider an e-mail system in which messages arrive with headers that include, among other things, the sender's name, the sender's public key, and a digital signature. When a recipient's e-mail reader processes an incoming message, it uses the public key to verify that the message and the signature go together (i.e., an adversary has not spliced a signature from another message onto this message). The recipient may also be concerned about whether the iname and public key go together. In other words, could an adversary have taken a legitimate message-signature pair that he produced with this own signing key and then attached to it his public key and someone else's name? To address this concern, the recipient needs a policy that determines which name-key pairs are trustworthy. Because signed messages may regularly arrive from senders that he has never met, a simple private database of name-key pairs may not be sufficient. By way of example, a plausible policy might include the following:

(1) He maintains private copies of the name-key pairs ($N_1$, $PK_1$) and ($N_2$, $PK_2$). A reasonable interpretation of this part of the policy is that he knows the people named $N_1$ and $N_2$ personally and can get reliable copies of the public keys directly from them.

(2) He accepts "chains of trust" of length one or two. An arc in a chain of trust is a "certificate" of the form ($PK_i$, ($N_j$, PK$_j$), S). This is interpreted to means that the owner N$_i$ of PK$_i$ vouches for the binding between the name N$_j$ and the public key PK$_j$. This can also mean that N$_i$ attests that N$_j$ is trusted to provide certificates of this form. The party N$_i$ signs (N$_j$, PK$_j$) with his private key and the resulting signature S.

(3) He insists that there be two disjoint chains of trust from the keys that he maintains privately to the name-key pair that arrives with a signed message.

As a second example, consider a loan request submitted to an electronic banking system. Such a request might contain, among other things, the name of the requester and the amount requested. A plausible policy for approval of such loans might take the following form:

(1) Two approvals are needed from loans of less than $5,000. Three approvals are needed for loans of between $5,000 and $ 10,000Loans of more than $10,000 are not handled by this automated loan-processing system.

(2) The head of the loan division must authorize approvers' public keys. The division head's public key is currently PK$_3$. This key expires on Dec. 31, 1998.

As a third example, consider a typical request for action in a web-browsing system, such as "view URL http://www.research.att.com/." In constructing a viewing policy, a user may decide what type of metadata, or labels, she wants documents to have before viewing them, and whom she trusts to label documents. The user may insist that documents be rated (S≦2,L≦2,V=0, N≦2) on the sex (S), language (L), violence (V) and nudity (N) scales, respectively. She may trust self-labeling by some companies or any labels approved by certain companies.

Previous work on "protection systems" is loosely related to the concept of a trust-management system. Recent work that is similarly related to the present invention can be found in, for example, T. Y. C. Woo and S. S. Lam, "Authorization in distributed Systems: A New Approach," *Journal of Computer Security* 2 pp. 107–36 (1993). In addition, protection systems, as described by D. Denning, *Cryptography and Data Security,* Addison-Wesley, Reading (1982), address a similar, but not identical, problem.

M. A. Harrison, W. L. Ruzzo and J. D. Ullman, "Protection in Operating Systems," *Communications of the ACM* 19, pp. 461–71 (1976) analyze a general protection system based on the "access matrix" model. In matrix A, indexed by subjects and objects, cell A$_{SO}$ records the rights of subject S over the object o; a set of transition rules describes the rights needed as preconditions to modify A and the specific ways in which A can be modified, by creating subjects and objects or by entering or deleting rights at a single cell. Harrison et al. showed that given (1) an initial state A$_0$; (2) a set Δ of transition rules and (3) a right r, it is undecidable whether some sequence $\delta_{i_0} \ldots \delta_{i_1} \epsilon \Delta$ transforms A$_0$ such that $\delta_{i_1}$ enters r into a cell not previously containing r, i.e., whether it is possible for some subject, not having right r over some object, ever to gain that right. On the other hand, Harrison et al. identify several possible restrictions on Δ and give decision algorithms for input subject to one of these restrictions. One restriction they consider yields a PSPACE-complete problem.

Independently, A. K. Jones, R J. Lipton and L. Snyder, "A Linear Time Algorithm for Deciding Security, Proceedings of the Symposium on Foundations of Computer Science," *IEEE Computer Society Press,* Los Alamitos, pp. 33–41 (1976) define and analyze "take-grant" directed-graph systems. Subjects and objects are nodes; an arc α from node n$_1$ to n$_2$ is labeled by the set of rights n$_1$ has over n$_2$. If subject n$_1$ has the "take" right over n$_2$, and n$_2$ has some right r over n$_3$, then a legal transition is for n$_1$ to take right r over n$_3$. Similarly, if the subject n$_1$ has the "grant" right over n$_2$, and n$_1$ has some right r over n$_3$, then a legal transaction is for n$_1$ to grant right r over n$_3$ to n$_2$. Besides these transitions, subjects can create new nodes and remove their own rights over their immediate successors. Although rights are constrained to flow only via take-grant paths, take-grant systems do model non trivial applications.

Jones et al. asked whether a right r over a node x possessed by n$_1$, but not possessed by n$_2$, could ever be acquired by n$_2$. They showed that this question can be decided in time linear in the original graph by depth-first search. Thus, Denning concludes that although safety in protection systems is usually undecidable, the results in, for example, Jones et al. demonstrate that safety can be decided feasibly in systems with sets of transition rules from a restricted though non-trivial set. The related results on compliance-checking described herein provide additional support for Denning's conclusion.

Having reviewed the basics of "protection systems," it can be seen why they address a similar but not identical problem to the one addressed by the compliance-checking algorithm described herein. In the protection system world, there is a relatively small set of potentially dangerous actions that could ever be performed, and this set is agreed upon in advance by all parties involved. A data structure, such as an access matrix, records which parties are allowed to take which actions. This data structure is pte-computed offline, and, as requests for action arrive, their legitimacy is decided via a lookup operation in this data structure. "Transition rules" that change the data structure are applied infrequently, and they are implemented by a different mechanism and in a separate system module from the ones that handle individual requests for action.

In the trust-management system world, the set of potentially dangerous actions is large, dynamic, and not known in advance. A system provides a general notion of "proof of compliance" for use by diverse applications that require trust policies. The users of these applications and the semantics of their actions and policies are not even known to the compliance-checking algorithm; hence it is not possible for all parties to agree in advance on a domain of discourse for all potentially dangerous actions. The compliance-checking question "is request r authorized by policy P and credential set C?" is analogous to the question "can subject S eventually obtain right r by transition rules Δ" in the protection system world. However, a single instance of request processing, especially one that involves deferral of trust, can require a moderately complex computation and not just a lookup in a pre-computed data structure. Accordingly, an embodiment of the present invention formalizes the complexity of a general-purpose, working system for processing requests of this nature. In summary, a general purpose trust-management system is, very roughly speaking, a meta-system in the protection system framework.

In addition, an application-independent notion of compliance checking can be useful and can enhance security. Any product or service that requires proof that a requested transaction complies with a policy could implement a special-purpose compliance checker from scratch. One important advantage of a general purpose compliance checker is the soundness and reliability of both the design and the implementation of the compliance checker. Formalizing the notion of "credentials proving that a request complies with a policy" involves subtlety and detail. It is easy to get wrong, and an application developer who sets out to implement something simple to avoid an "overly complicated" syntax of a general-purpose compliance checker is likely to find that: (1) she has underestimated the complexity of the application's needs for expressiveness and proof or (2) her special-purpose compliance checker is not turning out so simple.

A general-purpose notion of proof of compliance can be explained, formalized, proven correct, and implemented in a standard package, to free developers of individual applications from the need to reinvent the system. Applications that use a standard compliance checker can be assured that the answer returned for any given input (such as a request. a policy, and a set of credentials) depends on the input, and not on any implicit policy decisions (or bugs) in the design or implementation of the compliance checker. As policies and credentials become more diverse and complex, the issue of assuring correctness will become even more important, and modularity of function (with a clean separation between the role of the application and the role of the compliance checker) will make further development more manageable.

Two important sources of complexity that are often underestimated are delegation and cryptography. Products and services that need a notion of "credential" almost always have some notion of "delegation" of the authority to issue credentials. The simplest case, unconditional delegation, is easily handled by a special-purpose mechanism. However, if the product or service grows in popularity and starts to be used in ways that were not foreseen when originally deployed, delegation can quickly become more complex, and a special-purpose language that restricts the types of conditional delegation that the service can use may become an impediment to widespread and imaginative use.

The general framework for compliance checking avoids this by letting delegation be described by ordinary programs. Similarly, digital signatures and other browsers can be designed to accommodate "safe surfing" policies configurable by parents, but may not initially involve cryptographic functions. If the application is subsequently integrated into the wider world of electronic commerce, however, cryptography may be desired and cryptographic credentials, such as public-key certificates, may need to be incorporated into the application's notion of proof of compliance. If the application already uses a general-purpose notion of proof of compliance, this can be done without having to rethink and re-code the compliance-checker.

In addition, a general-purpose compliance checker can facilitate inter-operability. Requests, policies, and credentials, if originally written in the native language of a specific product or service, must be translated into a standard format understood by the compliance checker. Because a wide variety of applications will each have translators with the same target language, policies and credentials originally written for one application can be used by another. The fact that the compliance checker can serve as a locus of inter-operability may prove particularly useful in e-commerce applications and, more generally, in all setting in which public-key certificates are needed.

Another possible problem with a compliance-checking algorithm is the possibility of self-referencing assertions. For example, a digitally signed assertion by party A might represent "I approve this request if, and only if, party B approves this request" while an assertion by party B represents "I approve this request if, and only if, party A approves this request." Although this request should perhaps be approved, a compliance-checking algorithm may not recognize this fact.

In view of the foregoing, it can be appreciated that a substantial need exists for a method, solvable in polynomial time and widely applicable, that checks the compliance of a request with a policy assertion based on credential assertions and solves the other problems discussed above.

SUMMARY OF THE INVENTION

The disadvantages of the art are alleviated to a great extent by a method and apparatus for compliance checking in a trust-management system. A request r, a policy assertion ($f_0$, POLICY), and n−1 credential assertions ($f_1$, $s_1$), . . . , ($f_{n-1}$, $s_{n-1}$) are received, each credential assertion comprising a credential function $f_i$ and a credential source $s_i$. Each assertion may be monotonic, authentic, and locally bounded. An acceptance record set S is initialized to a set of the triple {($\Lambda$, $\Lambda$, R)}, where $\Lambda$ represents an empty portion of the acceptance record, and R represents the request r. Each assertion ($f_i$, $s_i$), where i represents the integers from n−1 to 0, is run and the result is added to the acceptance record set S. This is repeated mn times, where m represents a number greater than 1, and an acceptance is output if any of the results in the acceptance record set S comprise an acceptance record (0, POLICY, R).

With these and other advantages and features of the invention that will become hereinafter apparent, the nature of the invention may be more clearly understood by reference to the following detailed description of the invention, the appended claims and to the several drawings attached herein.

DETAILED DESCRIPTION

The present invention is directed to a method and apparatus for compliance checking in a trust-management system. A general problem addressed by an embodiment of the present invention is Proof of Compliance (POC). The question is whether a "request" r complies with a "policy." The policy is simply a function $f_0$ encoded in a programming system or language and labeled by, for example, a keyword such as "POLICY." In addition to the request and the policy, a POC instance contains a set of "credentials," which also include general functions. Policies and credentials are collectively referred to as "assertions."

Credentials are issued by "sources." Formally, a credential is a pair ($f_i$, $s_i$) of function $f_i$ and source identifier (ID) $s_i$, which may be a string over some appropriate alphabet Π. Some examples of source IDs include public keys of credential issuers, URLs, names of people, and names of companies. In one embodiment of the present invention, with the exception of the keyword POLICY, the interpretation of source-IDs is part of the application-specific semantics of an assertion, and it is not the job of the compliance checker. From the compliance checker's point of view, the source-IDs are just strings, and the assertions encode a set of, possibly indirect and possibly conditional, trust relationships among the issuing sources. Associating each assertion with the correct source-ID is, according to this embodiment, the responsibility of the calling application and takes place before the POC instance is handed to the compliance checker.

The request r may be a string encoding an "action" for which the calling application seeks a proof of compliance. In the course of deciding whether the credentials $(f_1, s_1), \ldots, )f_{n-1}, s_{n-1})$ constitute a proof that R complies with the policy $(f_0, \text{POLICY})$, the compliance checker's domain of discourse may need to include other action strings. A request r may include, for example, a request to access or copy a data object, or to play a data object that contains, for example, audio content.

For example, if POLICY requires that r be approved by credential issuers $s_1$ and $s_2$, the credentials $(f_1, s_1)$ and $(f_2, s_2)$ may want a way to say that they approve r "conditionally," where the condition is that the other credential also approve it. A convenient way to formalize this is to use strings R, $R_1$ and $R_2$ over some finite alphabet $\Sigma$. The string R corresponds to the requested action r. The strings $R_1$ and $R_2$ encode conditional versions of R that might by approved by $s_1$ and $s_2$ as intermediate results of the compliance-checking procedure.

More generally, for each request r and each assertion $(f_i, s_i)$, there is a set $\{R_{ij}\}$ of "action strings" that might arise in a compliance check. By convention, there is a distinguished string R that corresponds to the input request r. The range of assertion $(f_i, s_i)$ is made up of "acceptance records" of the form (i, $s_i$, $R_{ij}$), the meaning of which is that, based on the information at its disposal, assertion number i, issued by source $s_i$, approves action $R_{ij}$. A set of acceptance records is referred to as an "acceptance set." It is by maintaining acceptance sets and making them available to assertions that the compliance checker manages "inter-assertion communication," giving assertions the chance to make decisions based on conditional decisions by other assertions. The compliance checker starts with an "initial acceptance set" $\{(\Lambda, \Lambda, R)\}$, in which the one acceptance record means that the action string for which approval is sought is R and that no assertions have yet signed off on it or anything else. The checker runs the assertions $(f_0, \text{POLICY}), (f_1, s_1), \ldots, (f_{n-1}, s_{n-1})$ that it has received as input, not necessarily in that order and not necessarily once each, to determine which acceptance records are produced. Ultimately, the compliance checker approves the request r if the acceptance record (0, POLICY, R), which means "policy approves the initial action string," is produced. Note that the use of the string "POLICY" herein is by way of example only, and any other information may of course be used instead.

Thus, abstractly, an assertion is a mapping from acceptance sets to acceptance sets. Assertion $(f_i, s_i)$ looks at an acceptance set A encoding the actions that have been approved so far, and the numbers and sources of the assertions that approved them. Based on this information about what the sources it trusts have approved, $(f_i, s_i)$ outputs another acceptance set A'.

The most general version of the compliance-checking problem, or "proof of compliance," is: given as input a request r and a set of assertions $(f_0, \text{POLICY}), (f_1, s_1), \ldots, (f_{n-1}, s_{n-1})$, is there a finite sequence $i_1, i_2, \ldots, i_t$ of indices such that each $i_j$ is in $\{0, 1, \ldots, n-1\}$, but the $i_j$'s are not necessarily distinct and not necessarily exhaustive of $\{0, 1, \ldots, n-1\}$, and such that:

$$(0, \text{POLICY}, R) \in (f_{i_1}, s_{i_1}) \circ \ldots \circ (f_{i_t}, s_{i_t}) (\{(\Lambda, \Lambda, R)\}),$$

where R is the action string that corresponds to the request r?

This general version of the problem is mathematically undecidable. A compliance checker cannot even decide whether an arbitrary assertion $(f_i, s_i)$ halts when given an arbitrary acceptance set as input, much less whether some sequence containing $(f_i, s_i)$ produces the desired output. Therefore, various special cases of POC will now be described, including one that is both useful and computationally tractable.

The statement "$\{(f_0, \text{POLICY}), (f_1, s_1), \ldots, (f, s_{n-1})\}$ contains a proof that r complies with POLICY," means that (r, $\{(f_0, \text{POLICY}), (f_1, s_1), \ldots, (f_{n-1}, s_{n-1})\}$) is a "yes-instance" of this unconstrained, most general form of POC. If F is a, possibly proper, subset of $\{(f_0, \text{POLICY}), (f_1, s_1), \ldots, (f_{n-1}, s_{n-1})\}$ that contains all of the assertions that actually appear in the sequence $(f_{i_1}, s_{i_1}) \circ \ldots \circ (f_{i_t}, s_{i_t})$, then "F contains a proof that r complies with POLICY."

In order to obtain a useful restricted version of POC, various pieces of information may be added to the problem instances. Specifically, the instance (r, $\{(f_0, \text{POLICY}), (f_1, s_1), \ldots, (f_{n-1}, s_{n-1})\}$) may be augmented in one or more of the following ways.

Global Run Time Bound

An instance may contain an integer d such that a sequence of assertions $(f_{i_1}, s_{i_1}), \ldots, (f_{i_t}, s_{i_t})$ is considered a valid proof that r complies with POLICY if the total amount of time that the compliance checker needs to compute $(f_{i_1}, s_{i_1}) \circ \ldots \circ (f_{i_t}, s_{i_t}) (\{(\Lambda, \Lambda, R)\})$ is $O(N^d)$. Here N is the length of the original problem instance, i.e., the number of bits needed to encode r, $(f_0, \text{POLICY}), (f_1, s_1), \ldots, (f_{n-1}, s_{n-1})$, and d in some standard fashion.

Local Run Time Bound

An instance may contain an integer c such that $(f_{i_1}, s_{i_1}), \ldots, (f_{i_t}, s_{i_t})$ is considered a valid proof that R complies with POLICY if each $(f_{i_j}, s_{i_j})$ runs in time $O(N^c)$. Here N is the length of the actual acceptance set that is input to $(f_{i_j}, s_{i_j})$ when it is run by the compliance checker. Note that the length of the input fed to an individual assertion $(f_{i_j}, s_{i_j})$ in the course of checking a proof may be considerably bigger than the length of the original problem instance (r, $\{(f_0, \text{POLICY}), (f_1, s_1), \ldots, (f_{n-1}, s_{n-1})\}$, c), because the running of assertions $(f_{i_1}, s_{i_1}), \ldots, (f_{i_{j-1}}, s_{i_{j-1}})$ may have caused the creation of many new acceptance records.

Bounded Number of Assertions in a Proof

An instance may contain an integer 1 such that $(f_{i_1}, s_{i_1}), \ldots, (f_{i_t}, s_{i_t})$ is considered a valid proof if $t \leq 1$.

Bounded Output Set

An instance may contain integers m and S such that an assertion $(f_i, s_i)$ can be part of a valid proof that r complies with POLICY if there is a set $O_i = \{R_{i1}, \ldots, R_{im}\}$ of m action strings, such that $(f_i, s_i)(A) \subset O_i$ for any input set A, and the maximum size of an acceptance record (i, $s_i$, $R_{ij}$) is S. Intuitively, for any user-supplied request r, the meaningful "domain of discourse" for assertion $(f_i, s_i)$ is of size at most m—there are at most m actions that it would make sense for $(f_i, s_i)$ to sign off on, no matter what the other assertions in the instance say about r.

Monotonicity

Other variants of POC are obtained by restricting attention to instances in which the assertions have the following property: $(f_i, s_i)$ is "monotonic" if, for all acceptance sets A and B, $A \subset B \Rightarrow (f_i, s_i)(A) \subset (f_i, s_i)(B)$. Thus, if $(f_i, s_i)$ approves action $R_{ij}$ when given a certain set of "evidence" that $R_i$ is ok, it will also approve $R_{ij}$ when given a super-set of that evidence—it does not have a notion of "negative evidence."

Any of the parameters l, m, and S that are present in a particular instance may be written in unary so that they play an analogous role to n, the number of assertions, in the calculation of the total size of the instance. The parameters d and c are exponents in a run time bound and hence may be written in binary.

Any subset of the parameters d, c, l, m, and S may be present in a POC instance, and each subset defines a POC variant. Including a global run time bound d makes the POC problem decidable, as does including parameters c and l.

In stating and proving results about the complexity of POC, the notion of a "promise problem," as discussed in S. Even, A. Selman and Y. Yacobi, the "Complexity of Promise Problems with Applications to Public-Key Cryptography," *Information and Control* 61, pp. 159–174 (1984), may be used. In a standard decision problem, a language L is defined by a predicate R in that $x \in L \Leftrightarrow R(x)$. In a promise problem, there are two predicates, the promise Q and the property R. A machine M solves the promise problem (Q, R) if, for all inputs for which the promise holds, the machine M halts and accepts x if and only if the property holds. Formally, $\forall x[Q(x) \Rightarrow [M$ halts on x and $M(x)$ accepts$\Leftrightarrow R(x)]]$. Note that M's behavior is unconstrained on inputs that do not satisfy the promise, and each set of choices for the behavior of M on these inputs determines a different solution. Thus, predicates Q and R define a family of languages, namely all L such that L=L(M) for some M that solves (Q, R).

The class NPP consists of all promise problems with at least one solution in NP. A promise problem is NP-hard if it has at least one solution and all of its solutions are NP-hard. To prove that a promise problem (Q, R) is NP-hard, it suffices to start with an NP-hard language L and construct a reduction whose target instances all satisfy the promise Q and satisfy the property R if and only if they are images of strings in L.

The following are POC variants that can be shown to be NP-hard, which is generally interpreted to mean that they are computationally intractable in the worst case.

Locally Bounded Proof of Compliance (LBPOC)

In this case, the "input" is a request r, a set $\{(f_0, \text{POLICY}), (f_1, s_1), \ldots, (f_{n-1}, s_{n-1})\}$ of assertions, and integers c, l, m, and S. The "promise" is that each $(f_i, s_i)$ runs in time $O(N^c)$. On any input set that contains $(\Lambda, \Lambda, R)$, where R is the action string corresponding to request r, for each $(f_i, s_i)$ there is a set $O_i$ of at most m action strings such that $(f_i, s_i)$ only produces output from $O_i$, and S is the maximum size of an acceptance record $(i, s_i, R_{ij}))$, where $R_{ij} \in O_i$. Finally, the "question" can be stated as follows: is there a sequence $i_1, \ldots, i_l$ of indices such that:

1. Each $i_j$ is in $\{0, 1, \ldots, n-1\}$, but the $i_j$ need not be distinct or collectively exhaustive of $\{0, 1, \ldots, n-1\}$;

2. $t \leq 1$, and 3. $(0, \text{POLICY}, R) \in (f_{i_1}, s_{i_1}) \circ \ldots \circ (f_{i_l}, s_{i_l}) (\{(\Lambda, \Lambda, R)\})$?

Globally Bounded Proof of Compliance (GBPOC)

In this case, the "input" is a request r, a set $\{(f_0, \text{POLICY}), (f_1, s_1), \ldots, (f_{n-1}, s_{n-1})\}$ of assertions, and an integer d. The "question" can be stated as follows: is there a sequence $i_1, \ldots, i_l$ of indices such that:

1. Each $i_j$ is in $\{0, 1, \ldots, n-1\}$, but the $i_j$ need not be distinct or collectively exhaustive of $\{0, 1, \ldots, n-1\}$;

2. $(0, \text{POLICY}, R) \in (f_{i_1}, s_{i_1}) \circ \ldots \circ (f_{i_l}, s_{i_l}) (\{(\Lambda, \Lambda, R)\})$, where R is the action string corresponding to request r, and;

3. The computation of $(f_{i_1}, s_{i_1}) \circ \ldots \circ (f_{i_l}, s_{i_l}) (\{(\Lambda, \Lambda, R)\})$ runs in total time $O(N^d)$?

Monotonic Proof of Compliance (MPOC)

In this case, the "input" is a request r, a set $\{(f_0, \text{POLICY}), (f_1, s_1), \ldots, (f_{n-1}, s_{n-1})\}$ of assertions, and integers 1 and c. The "promise" is that each assertion $(f_i, s_i)$ is monotonic and runs in time $O(N^c)$. The "question" can be stated as follows: is there a sequence $i_1, \ldots, i_l$ of indices such that:

1. Each $i_j$ is in $\{0, 1, \ldots, n-1\}$, but the $i_j$ need not be distinct or collectively exhaustive of $\{0, 1, \ldots, n-1\}$;

2. $t \leq 1$; and

3. $(0, \text{POLICY}, R) \in (f_{i_1}, s_{i_1}) \circ \ldots \circ (f_{i_l}, s_{i_l}) (\{(\Lambda, \Lambda, R)\})$, where R is the action string corresponding to request r?

Each version of POC may be defined using "agglomeration" $(f_2, s_2) \star (f_1, s_1)$ instead of composition $(f_2, s_2) \circ (f_1, s_1)$. The result of applying the sequence of assertions $(f_{i_1}, s_{i_1}), \ldots, (f_{i_l}, s_{i_l})$ agglomeratively to an acceptance set $S_0$ is defined inductively as follows: $S_1 \equiv (f_{i1}, s_{i1})(S_0) \cup S_0$ and, for $2 \leq i \leq t$, $S_i \equiv (f_{i_i}, s_{i_i})(S_{j-1}) \cup S_{j-1}$. Thus, for any acceptance set A, $A \subset (f_{i_1}, s_{i_1}) \star \ldots \star (f_{i_l}, s_{i_l})(A)$. The agglomerative versions of the decision problems are identical to the versions already given, except that the acceptance condition is "$(0, \text{POLICY}, R) \in (f_{i_1}, s_{i_1}) \star \ldots \star (f_{i_l}, s_{i_l}) (\{(\Lambda, \Lambda, R)\})$?" As used herein, "agglomerative POC," "agglomerative MPOC," etc., refer to the version defined in terms of $\star$ instead of $\circ$.

A trust-management system that defines "proof of compliance" in terms of agglomeration can make it impossible for an assertion to "undo" an approval that it (or any other assertion) has already given to an action string during the course of constructing a proof. This definition of proof may make sense if the trust-management system should guard against a rogue credential-issuer's ability to thwart legitimate proofs. Note that the question of whether the compliance checker combines assertions using agglomeration or composition is separate from the question of whether the assertions themselves are monotonic.

A compliance-checking algorithln according to a preferred embodiment of the present invention will now be described. A specific case of a POC problem associated with this embodiment will be explained. The promise that defines this special case includes some conditions that have already been discussed, namely monotonicity and bounds on the run time of assertions and on the total size of acceptance sets that assertions can produce. According to one embodiment of the present invention, however, another condition is considered, called "authenticity," which could be ignored when proving hardness results. An authentic assertion $(f_i, s_i)$ produces acceptance records of the form $(i, s_i, R_{ij})$. That is, it does not "impersonate" another assertion by producing an acceptance record of the form $(i', s_{i'}, R_{i'j})$, for i' not equal to i, or si' not equal to si.

An embodiment of the present invention constructs proofs in an agglomerative fashion, and hence $\star$ is used in the following problem statement. Note that a variant of POC could be defined using $\circ$ as well.

Locally Bounded, Monotonic, and Authentic Proof of Compliance (LBMAPOC)

According to this embodiment of the present invention, the "input is a request r, a set $\{(f_0, \text{POLICY}), (f_1, s_1), \ldots, (f_{n-1}, s_{n-1})\}$ of assertions, and integers c, m, and S. The "promise" is that each $(f_i, s_i)$ is monotonic, authentic, and runs in time $O(N^c)$. On any input set that contains $(\Lambda, \Lambda, R)$, where R is the action string corresponding to request r, for each $(f_i, s_i)$ there is a set $O_i$ of at most m action strings such that $(f_i, s_i)$ produces output from $O_i$. Moreover, S is the maximum size of an acceptance record $(i, s_i, R_{ij})$, such that $R_{ij} \epsilon O_i$. Finally, the "question" can be stated as follows: is there a sequence $i_1, \ldots, i_1$ of indices such that each $i_j$ is in $\{0, 1, \ldots, n-1\}$, but the $i_j$ need not be distinct or collectively exhaustive of $\{0, 1, \ldots, n-1\}$, and $(0, \text{POLICY}, R) \epsilon (f_{i_1}, s_{i_1}) \star \ldots \star (f_{i_1}, s_{i_1}) (\{(\Lambda, \Lambda, R)\})$?

Figure 1:
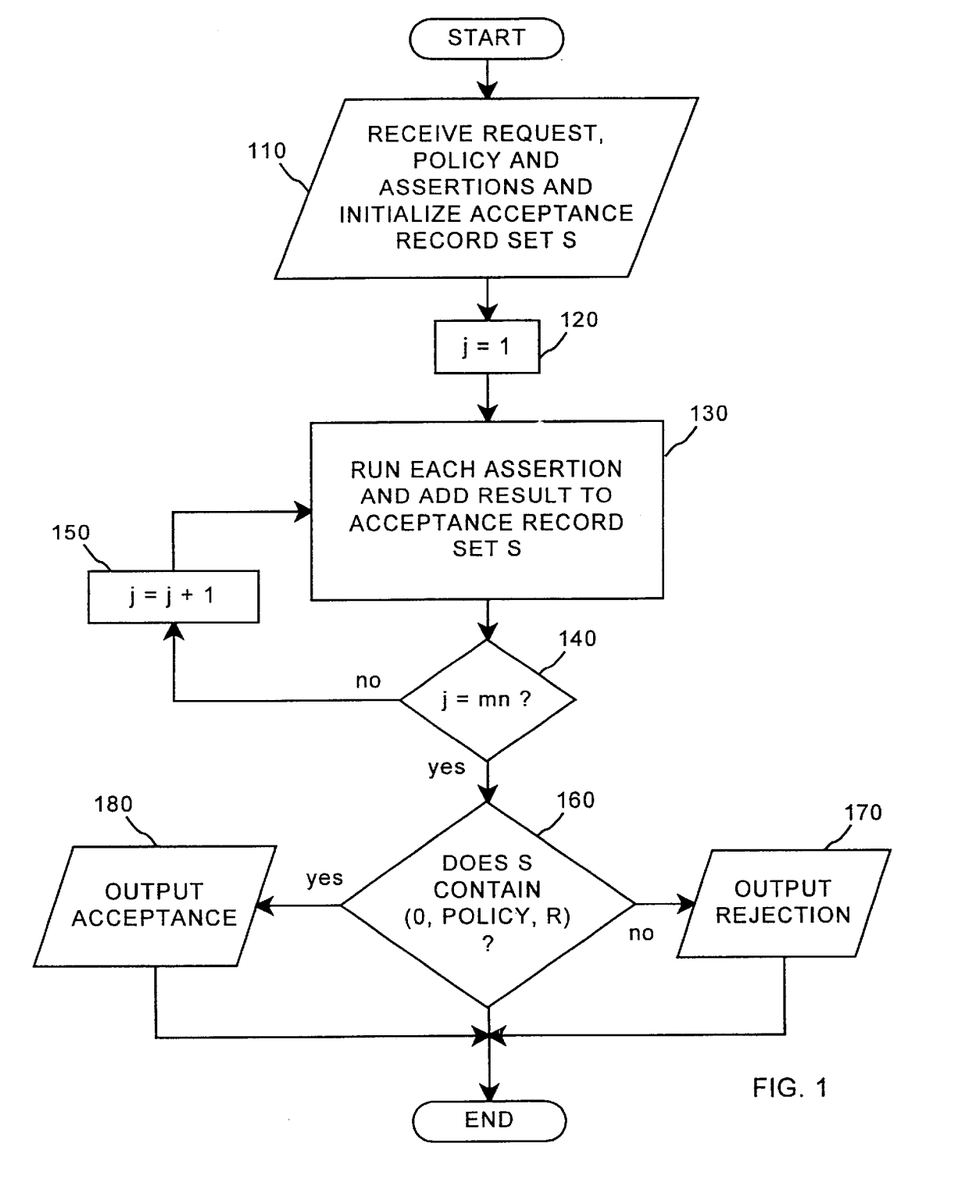
FIG. 1 is a flow diagram of a method of compliance checking for a trust-management system according to an embodiment of the present invention.

Referring now in detail to the drawings wherein like parts are designated by like reference numerals throughout, there is illustrated in FIG. 1 a flow diagram of a method of compliance checking for a trust-management system according to an embodiment of the present invention. The flow chart in FIG. 1 is not meant to imply a fixed order to the steps; embodiments of the present invention can be practiced in any order that is practicable. At step 110, a request r, a policy assertion $(f_0, \text{POLICY})$ associated with the request r, and n–1 credential assertions $(f_1, s_1), \ldots, (f_{n-1}, s_{n-1})$ are received, each credential assertion comprising a credential function $f_i$ and a credential source $s_i$. In addition, an acceptance record set S is initialized to $\{(\Lambda, \Lambda, R)\}$ at step 110, where $\Lambda$ represents a distinguished "null string" and R represents the inital request, r.

At step 120,j is initialized to 1. At step 130 each assertion $(f_i, s_i)$, for integers i from 0 to n–1, is run and the result is added to the acceptance record set S. If j does not equal mn at step 140, where m is a number greater than 1, j is increased by 1 at step 150 and step 130 is repeated.

If j does equal mn at step 140, it is determined if acceptance set S contains an acceptance record, such as (0, POLICY, R), at step 160. If not, a rejection is output at step 170. If acceptance set S does contain the acceptance record, an acceptance is output at step 180.

The following pseudo-code demonstrates the algorithm according to one embodiment of the present invention, referred to herein as the "Compliance-Checking Algorithm version 1" (CCA$_1$):

of the algorithm. Instead, the predicate IllFormed () indicates that the checks may done for each simulation.

Like the non-deterministic algorithms discussed above, CCA$_1$ accepts if and only if the acceptance record (0, POLICY, R) is produced when it simulates the input assertions. Unlike the previous algorithms, however, it cannot non-deterministically guess an order in which to do the simulation. Instead, it uses an arbitrary order. CCA$_1$ also ensures that, if a proper subset F of the input assertions contains a proof that R complies with POLICY and every $(f_i, s_i) \in F$ satisfies the promise, then the remaining assertions do not destroy all or part of the acceptance records produced by F during the simulation (and destroy the proof), even if these remaining assertions do not satisfy the promise. CCA$_1$ achieves this by maintaining one set of approved acceptance records, from which no records are ever deleted, i.e., by agglomerating, and by discarding assertions that it discovers are ill-formed.

Note that CCA$_1$ does mn iterations of the sequence $(f_{n-1}, s_{n-1}), \ldots, (f_1, s_1), (f_0, \text{POLICY})$, for a total of mn$^2$ assertion-simulations. Recall that a set $F = \{(f_{j_1}, s_{j_1}), \ldots, (f_{j_1}, s_{j_1})\} \subset \{(f_0, \text{POLICY}), \ldots, (f_{n-1}, s_{n-l})\}$ "contains a proof that r complies with POLICY" if there is some sequence $k_1, \ldots, k_u$ of the indices $j_l, \ldots, j_1$, not necessarily distinct and not necessarily exhaustive of $j_1, \ldots, j_1$, such that $(0, \text{POLICY}, R) \in (f_{k_u}, s_{k_u}) \star \ldots \star (f_{k_1}, s_{k_1}) (\{(\Lambda, \Lambda, R)\})$.

Let $(r, \{(f_0, \text{POLICY}), (f_1, s_1), \ldots, (f_{n-1}, s_{n-1})\}, c, m, s)$ be an agglomerative LBMAPOC instance. As a result:

1. Suppose that $F \subset \{(f_0, \text{POLICY}), (f_{n-1}, s_{n-1})\}$ contains a proof that R complies with POLICY and that every $(f_i, s_i) \in F$ satisfies the promise of LBMAPOC. Then CCA$_1$ accepts $(r, \{(f_0, \text{POLICY}), (f_1, s_1), \ldots, (f_{n-1}, s_{n-1})\}, c, m, s)$.

2. If $\{(f_0, \text{POLICY}), (f_1, s_1), \ldots, (f_{n-1}, s_{n-l})\}$ does not contain a proof that R complies with POLICY, then CCA$_1$ rejects $(r, \{(f_0, \text{POLICY}), (f_1, s_1), \ldots, (f_{n-1}, s_{n-1})\}, c, m, s)$.

```
CCA₁(r, {(f₀, POLICY), (f₁, s₁), ..., (fₙ₋₁, sₙ₋₁)}, m):
{
    S ← {(Λ, Λ, R)}
    I ← {}
    For j ← 1 to mn
    {
        For i ← n – 1 to 0
        {
            If (fᵢ, sᵢ) ∉ I, Then S' ← (fᵢ, sᵢ)(S)
            IfIllFormed((fᵢ, sᵢ)), Then I ← I ∪ {(fᵢ, sᵢ)}, Else S ← S ∪ S'
        }
    }
    If(0, POLICY, R) ∈ S, Then Output(Accept), Else Output(Reject)
}
```

Note that an assertion $(f_i, s_i)$ is "ill-formed" if it violates the promise. If CCA$_1$ discovers that $(f_i, s_i)$ is ill-formed, the assertion is ignored for the remainder of the computation. An assertion $(f_i, s_i)$ may be undetectably ill-formed. For example, there may be sets $A \subset C$ B such that $(f_i, s_i)(A) \subset (f_i, s_i)(B)$, but such that A and B do not arise in this run of the compliance checker. The CCA$_1$ algorithm may check for violations of the promise every time it simulates an assertion. Detailed pseudo-code for these checks is not included in CCA$_1$, because it would not illustrate the basic structure 3. CCA$_1$ runs in time $O(mn^2(nms)^c)$.

The only non trivial claim above is (1). Let $F = \{(f_{j_1}, s_{j_1}), \ldots, (f_{j_l}, s_{j_l})\}$ be a set that satisfies the hypothesis of (1). Each assertion in F is monotonic, and, as CCA$_1$ runs assertions agglomeratively, it never deletes acceptance records that have already been produced but rather just adds new ones. Therefore, it may be assumed without loss of generality that F contains all of the well-formed assertions in $\{(f_0, \text{POLICY}), (f_1, s_1), \ldots, (f_{n-1}, s_{n-1})\}$.

Let $k_1, \ldots, k_u$ be a sequence of indices, each in $\{j_l, \ldots, j_1\}$, but not necessarily distinct and not necessarily exhaustive of $\{j_1, \ldots, j_1\}$, such that $(0, \text{POLICY}, R) \in (f_{k_u}, s_{k_u}) \star \ldots \star (f_{k_1}, s_{k_1}) (\{(\Lambda, \Lambda, R)\})$. Assume without loss of generality that no sequence of length less than u has this property. Let $A_1, \ldots, A_u$ be the acceptance sets produced by applying $(f_{k_1}, s_{k_1}), \ldots, (f_{k_u} s_{k_u})$. Because $k_1, \ldots, k_u$ is a shortest sequence that proves compliance using assertions in F, each set $A_p$ must contain at least one action string that is not present in any of $A_1, \ldots, A_{p-1}$. Thus, u iterations of $(f_0, \text{POLICY}) \star (f_1, s_1) \star \ldots \star (f_{n-l}, s_{n-l})$ would suffice for $CCA_1$. At some point in the first iteration $(f_{k_l}, s_{k_l})$ would be run, and because $CCA_1$ adds but never deletes acceptance records, $A_1$ or some super-set of $A_1$ would be produced. At some point during the second iteration, $(f_{k_2}, s_{k_2})$ would be run, and because $A_l$ would be contained in its input, $A_2$ or some superset of $A_2$ would be produced.

Each $(f_{j_h}, s_{j_h}) \in F$ satisfies the local boundedness promise, producing at most m distinct action strings in any computation that begins with $\{(\Lambda, \Lambda, R)\}$, regardless of the behavior of other (even ill-formed) assertions. Because $|F|=1 \leq n$, at most mn distinct action strings can be produced by assertions in F, and at most mn sets $A_p$ can be produced if each is to contain a record that is not contained in any earlier set. Thus, $u \leq mn$, and mn iterations of $(f_0, \text{POLICY})$ $\mathring{A}(f_1, s_1) \star \ldots \star (f_{n-1}, s_{n-1})$ suffice.

Note that cases (1) and (2) do not cover all possible inputs to $CCA_1$. There may be a subset F of the input assertions that does contain a proof that r complies with POLICY but that contains one or more ill-formed assertions. If $CCA_1$ does not detect that any of these assertions is ill-formed, because their ill-formedness is exhibited on acceptance sets that do not occur in this computation, then $CCA_1$ will accept the input. If it does detect ill-fonnedness, then, as specified here, $CCA_1$ may or may not accept the input, perhaps depending on whether the record $(0, \text{POLICY}, R)$ has already been produced at the time of detection. According to another embodiment of the present invention, $CCA_1$ is modified to restart whenever ill-formedness is detected, after discarding the ill-formed assertion so that it is not used in the new computation. The point is simply that $CCA_1$ should not be given a policy that trusts, directly or indirectly, a source of ill-formed assertions. Therefore, the policy author should know which sources to trust and modify the policy if a trusted source issues ill-formed assertions.

Figure 2:
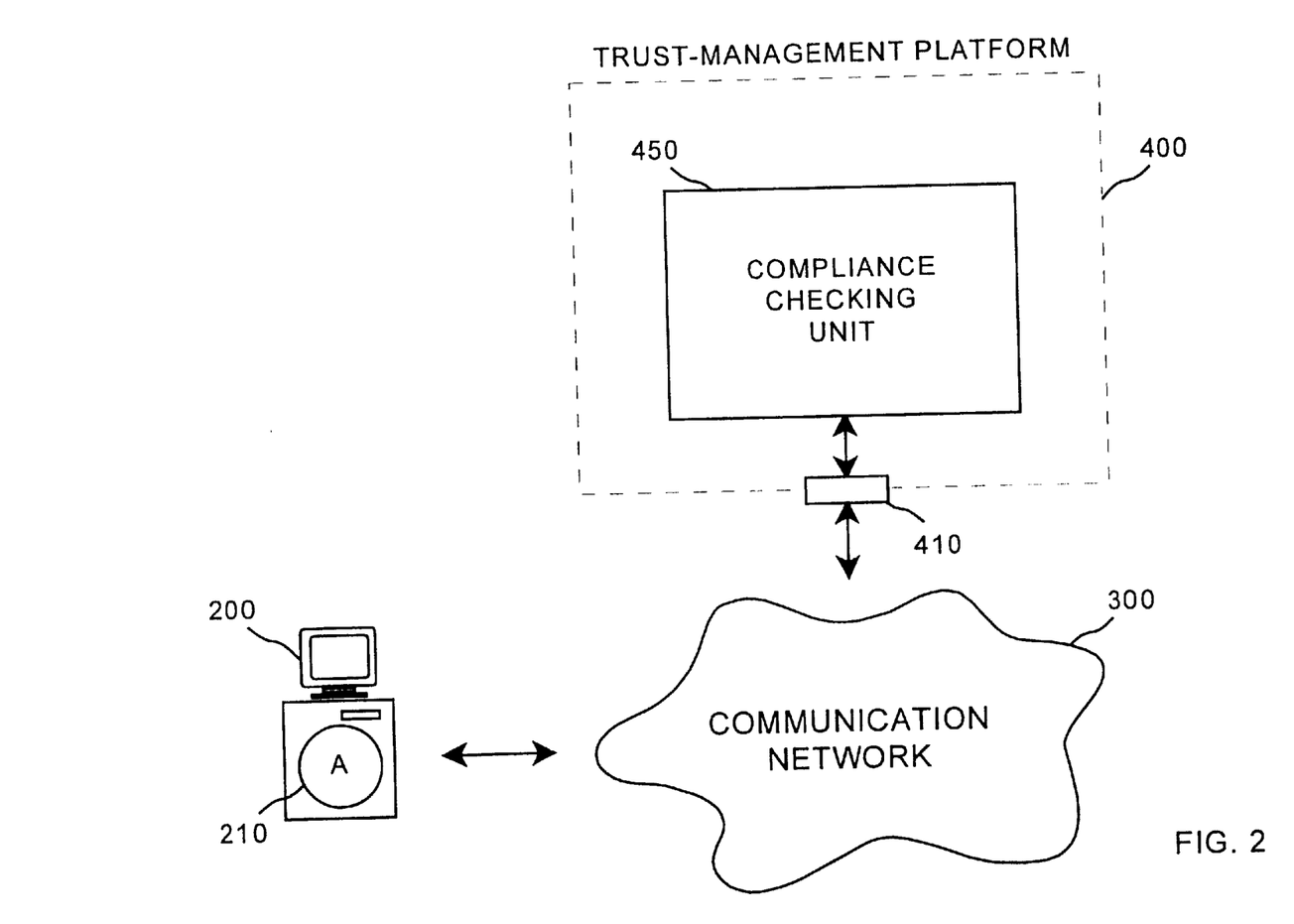
FIG. 2 is a block diagram of a compliance checker for a trust-management system according to an embodiment of the present invention.

FIG. 2 is a block diagram of a compliance checker for a trust-management system according to an embodiment of the present invention. An application 210 running on a user device 200 sends a request r to a trust management platform input port 410 through a communication network 300 such as, for example: a Local Area Network (LAN), the Public Switched Telephone Network (PSTN), an intranet, an extranet or the Internet. A compliance-checking unit 450 coupled to the input port 410 receives the request along with a policy assertion $(f_0, \text{POLICY})$ associated with the request and n–1 credential assertions $(f_1, s_1), \ldots, (f_{n-1}, s_{n-1})$, each credential assertion including a credential function $f_i$ and a credential source $s_i$. Note that the input port 410 may be a single physical input port, or several different input ports that may in turn be coupled to different networks or other devices. That is, the request, policy and credentials may not come from the same source or through the same channel.

The input port 410 is coupled to a compliance-checking unit 450, which may comprise, for example, the following (not shown in FIG. 2): a processing module with a Central Processing Unit (CPU); "memories" comprising a Random Access Memory (RAM) and a Read Only Memory (ROM); and a storage device. The memories and the storage device may store instructions adapted to be executed by the CPU to perform at least one embodiment of the method of the present invention. For the purposes of this application, the memories and storage device could include any medium capable of storing information and instructions adapted to be executed by a processor. Some examples of such media include, but are not limited to, floppy disks, CD-ROM, magnetic tape, hard drives, and any other device that can store digital information. In one embodiment, instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

The compliance-checking unit 450 initializes an acceptance record set S to $\{(\Lambda, \Lambda, R)\}$, where $\Lambda$ represents a distinguished null string and R represents the request r. The compliance-checking unit 450 runs assertion $(f_i, s_i)$ for integers i from 0 to n–1 and adds the result of each assertion $(f_i, s_i)$ to the acceptance record set S. This process is repeated mn times, where m represents a number greater than 1. The compliance-checking unit 450 may output an "acceptance," such as through port 410, or some other communication port, if any of the results in the acceptance record set S comprise an acceptance record $(0, \text{POLICY}, R)$. The compliance-checking unit 450 may instead, according to another embodiment of the present invention, perform the action R itself.

Thus, according to one embodiment of the present invention, the PolicyMaker system uses a notion of "proof that a request complies with a policy" that is amenable to definition and analysis. The choice of this notion of proof, however, is a subjective one and other notions of proof may also be used.

In deciding how a set of executable assertions can cooperate to produce a proof, a mechanism for "inter-assertion communication" of intermediate results may be used. For simplicity, assertions may communicate by outputting acceptance records that are input to other assertions. More sophisticated interactions, such as allowing assertions to call each other as subroutines, might be useful but may require a more complex execution environment. A trade-off might therefore exist between the cost of building and analyzing such an execution environment and the potential power to be gained by using more sophisticated interactions to construct proofs of compliance.

The choice of a simple communication mechanism implies that a part of constructing a proof of compliance is choosing an order in which to execute assertions. According to an embodiment of the present invention, the responsibility of choosing this order rests with the compliance checker and not, for example, the calling application. Although the compliance checker's job could be made easier by requiring the calling application to give it the correct order as an input, such a requirement may not be consistent with the system's overall goals. For example, applications may need to use credentials issued by diverse and far-flung sources without having to make assumptions about the order in which these credentials communicate via acceptance records. In an extreme case, the issuing sources may not be aware of each others' existence, and no such assumptions by the calling application would be valid. Although the most general version of the POC problem allows assertions to be arbitrary functions, the computationally tractable version may only be correct when all assertions are monotonic.

In particular, according to one embodiment of the present invention, monotonic policy assertions may produce a correct result, and this excludes certain types of policies that are used in practice, including those that use "negative credentials" such as revocation lists. Despite this restriction, the monotonicity requirement has certain advantages. Although the compliance checker may not handle all potentially desirable policies, it is at least analyzable and provably correct on a well-defined class of policies. Furthermore, the requirements of many non-monotonic policies can often be achieved by monotonic policies. For example, instead of requiring that an entity not appear on a revocation list, the system may require a "certificate of non-revocation." The choice between these two approaches involves trade-offs among the (system-wide) costs of the two kinds of credentials and the benefits of a standard compliance checker with provable properties. Moreover, restriction to monotonic assertions encourages a conservative, prudent approach to security. In order to perform a potentially dangerous action, a user must present an adequate set of affirnative credentials. Potentially dangerous action are not allowed "by default," simply because of the absence of negative credentials.

According to an embodiment of the present invention, the POC problem has been formulated in a way that allows assertions to be as expressive as possible. As a result, well-formedness promises such as monotonicity and boundedness, while formal and precise, may not be verified. Each assertion that conditionally trusts an assertion source for application-specific expertise (such as suitability for a loan) must also trust that source to write bounded and monotonic assertions and to trust other similar sources of assertions. The resulting notion of soundness is that if there is no proof from a set of trusted, well-formed assertions, then $CCA_1$ will not accept the input.

Full expressiveness, however, is just one goal of a trust-management system. Another goal is the clear separation of the trust relationships of assertions from programming details. To some extent, these goals are at odds—the compliance checker may not perform verifications on fully general programs, and thus an assertion writer may need to worry about some programming details.

Note that monotonic assertions may actually be written as, for example, AND-OR circuits and bounded assertions may actually "declare" the finite set from which they will produce output. A compliance-checking algorithm could then easily detect the ill-formed assertions and discard them. This would free assertion writers of the burden of deciding when another writer is trusted to write bounded and monotonic code, just as requiring assertions to be written in a safe (and therefore restricted) language frees the assertion writer from worrying about certain application-independent programming details. This verifiability comes at a price: listing a finite output set is relatively inexpensive, but there are monotonic functions that require exponentially bigger circuits to express over a basis of AND and OR than they require over a basis of AND, OR, and NOT. See, E. Tardos, "The Gap Between Monotone and Non-monotone Circuit Complexity is Exponential," Combinatorica 8, pp. 141–142 (1988). In some applications it may be cheaper, on average, to write assertions that are verifiably bounded and monotonic than to determine the set of sources trusted (even indirectly) by a given assertion and to judge whether they are trusted to be monotonic and bounded.

According to another embodiment of the present invention, the compliance checker makes the original code of an assertion that produced a record available to other assertions reading that acceptance record. A conservative policy then, before trusting assertions $(f_1, s_1)$ and $(f_2, s_2)$, could require and check that $f_1$ and $f_2$ be verifiably monotonic and bounded and that $f_1$ and $f_2$ each include specific standard code to check all assertions whose acceptance records $(f_1, s_1)$ and $(f_2, s_2)$ wish to trust. A complex monotonic assertion that needs to be written compactly using NOT gates can, if desired, still be used with the modified compliance algorithrn.

Although various embodiments are specifically illustrated and described herein, it will be appreciated that modifications and variations of the present invention are covered by the above teachings and within the purview of the appended claims without departing from the spirit and intended scope of the invention. For example, although specific pseudo-code was used to describe one embodiment of the present invention, it will be understood that other compliance-checking algorithms will also fall within the scope of the invention.

What is claimed is:

1. A method of compliance checking in a trust-management system, comprising:

a) receiving a request r, a policy assertion ($f_0$, POLICY ($s_0$)) associated with the request r, where $f_0$ is a credential function and POLICY($s_0$) is a credential source, and n–1 credential assertions ($f_1$, $s_1$) , . . . , ($f_{n-1}$, $s_{n-1}$), each credential assertion comprising the credential function $f_i$ and the credential source $s_i$;

b) initializing an acceptance record set S to $\{(\Lambda, \Lambda, R)\}$, where $\Lambda$ represents an empty portion of the acceptance record set S, and R represents the request r;

c) running assertion ($f_i$, $s_i$) on the acceptance set S for each integer i from n–1 to 0 and adding the result of each assertion ($f_i$, $s_i$) to the acceptance record set S;

d) repeating step (c) mn times, where m represents a number greater than 1;

e) determining if the acceptance record set S includes (0, POLICY, R), and f) determining acceptance or rejection of the request received by the system.

2. The method of claim 1, further comprising:

g) determining whether an assertion ($f_i$, $s_i$) is ill-formed; wherein step (c) is only performed for assertions ($f_i$, $s_i$) that are not ill-formed.

3. The method of claim 2, further comprising:

h) initializing a set I to an empty set; and i) adding any ill-formed assertions ($f_i$, $s_i$) to set I.

4. The method of claim 1, wherein a request r is a request to access a data object.

5. The method of claim 1, wherein a request r is a request to make a copy of a data object.

6. The method of claim 1, wherein a request r is a request to play a data object that includes audio content.

7. The method of claim 1, wherein a credential function includes a subject, an action, and an object.

8. The method of claim 1, wherein the request r is a string encoding an action for which a calling application seeks a proof of compliance.

9. The method of claim 1, wherein R represents an action string corresponding with the request r.

10. The method of claim 9, wherein the action string R includes a subject, an action and an object.

11. The method of claim 1, wherein a credential assertion includes one of a public key, a uniform resource locator and a name.

12. The method of claim 1, wherein credential function $f_i$ is correlated with a credential source $s_i$ by cryptographically signing the credential function $f_i$ with a private cryptographic key belonging to credential source $s_i$.

13. The method of claim 1, wherein each assertion is monotonic, authentic, and locally bounded.

14. A method of compliance checking in a trust-management system, comprising:

receiving (i) a request r to perform an action R and (ii) assertions $(f_0, \text{POLICY}(s_0)), (f_1, s_1), \ldots, (f_{n-1}, s_{n-1})$, where $f_0$ is a credential function and $\text{POLICY}(s_0)$ is a credential source;

executing, mn times, assertion $(f_i, s_i)$ for each integer i from n−1 to 0, the execution being performed using any information generated by previously executed assertions, m representing a number greater than 1;

determining if (0, POLICY, R) has been generated, and determining acceptance or rejection of the request.

15. An apparatus for compliance checking in a trust-management system, comprising:

a processor; and a memory storing instructions adapted to be executed by said processor to receive a request R to perform an action and assertions $(f_0, \text{POLICY}(s_0))$, where $f_0$ is a credential function and $\text{POLICY}(s_0)$ is a credential source, $(f_i, s_i), \ldots, (f_{n-1}, s_{n-1})$, initialize an acceptance record set S to $\{(\Lambda, \Lambda, R)\}$, where $\Lambda$ represents a distinguished null string, iteratively run, mn times, assertion $(f_i, s_i)$, on the acceptance set S for each integer i from n−1 to 0 and add the result of each assertion $(f_i, s_i)$ to the acceptance record set S, where m represents a number greater than 1, determine if the acceptance record set S includes (0, POLICY, R), and determining acceptance or rejection of the request received by the system.

16. A trust management platform, comprising:

an input port configured to receive a request, a policy assertion $(f_0, \text{POLICY}(s_0))$, where $f_0$ is a credential function and $\text{POLICY}(s_0)$ is a credential source, and credential assertions $(f_1, s_1), \ldots, (f_{n-1}, s_{n-1})$, each credential assertion comprising the credential function $f_i$ and the credential source $s_i$; and a compliance checking unit coupled to said input port and configured to:

a) initialize an acceptance record set S to $\{(\Lambda, \Lambda, R)\}$, where $\Lambda$ represents a distinguished null string and R represents information corresponding with the request, b) run assertion $(f_i, s_i)$ on the acceptance set S for each integer i from n−1 to 0 and add the result of each assertion $(f_i, s_i)$ to the acceptance record set S, c) repeat step (b) mn times, where m represents a number greater than 1, d) determine if acceptance record set S includes an acceptance record (0, POLICY, R) and e) determine acceptance or rejection of the request.

17. (Amended) A trust-management system, comprising:

means for receiving a request to perform an action r and a set of assertions $(f_0, \text{POLICY}(s_0)))$ where $f_0$ is a credential function and $\text{POLICY}(s_0)$ is a credential source, $(f_1, s_1), \ldots, (f_{n-1}, s_{n-1})$; and means for proving that the request r is consistent with the set of assertions.

18. A medium storing instructions adapted to be executed by a processor to perform steps including:

a) receiving a request r, a policy assertion $(f_0, \text{POLICY}(s_0))$, where $f_0$ is a credential function and $\text{POLICY}(s_0)$ is a credential source, associated with the request r, and n−1 credential assertions $(f_1, s_1), \ldots, (f_{n-1}, s_{n-1})$, each credential assertion comprising the credential function $f_i$ and the credential source $s_i$;

b) initializing an acceptance record set S to $\{(\Lambda, \Lambda, R)\}$, where $\Lambda$ represents a distinguished null string and R represents the request r;

c) running assertion $(f_i, s_i)$ on the acceptance set S for each integer i from n−1 to 0 and adding the result of each assertion $(f_i, s_i)$ to the acceptance record set S;

d) repeating step (c) mn times, where m represents a number greater than 1;

e) determining whether the acceptance record set S includes (0, POLICY, R), and f) determining acceptance or rejection of the request.

19. A method of compliance checking in a trust-management system, comprising:

a) receiving a request r, a policy assertion $(f_0, \text{POLICY}(s_0))$, where $f0$ is a credential function and $\text{POLICY}(s_0)$ is a credential source, associated with the request r, and n−1 credential assertions $(f_1, s_1), \ldots, (f_{n-1}, s_{n-1})$, each credential assertion comprising the credential function $f_i$ and the credential source $s_i$;

b) initializing an acceptance record set S to $\{(\Lambda, \Lambda, R)\}$, where $\Lambda$ represents a distinguished null string and R represents the request r;

c) for each integer i from n−1 to 0:

running assertion $(f_i, s_i)$ against the acceptance set S and adding the result to the acceptance record set S, determining if the acceptance record set includes (0, POLICY, R), and if the acceptance record set includes (0, POLICY, R), then stopping said method; and d) repeating step (c) mn times, where m represents a number greater than 1.

20. A method of compliance checking in a trust-management system, comprising:

a) receiving credential assertions $(f_1, s_1), \ldots, (f_{n-1}, s_{n-1})$, each credential assertion comprising a credential function $f_i$ and a credential source $s_i$;

b) initializing an acceptance record set S to $\{(\Lambda, R)\}$, where $\Lambda$ represents an empty portion of the acceptance record set S, and R represents a request;

c) running assertion $(f_i, s_i)$ on the acceptance set S for each integer i from n−1 to 0 and adding the result of each assertion $(f_i, s_i)$ to the acceptance record set S;

d) repeating step (c) mn times, where m represents a number greater than 1, and e) outputting an acceptance or rejection of the request.

* * * * *